United States Patent
Takahashi (10) Patent No.: US 8,886,255 B2
(45) Date of Patent: Nov. 11, 2014

(54) MOBILE TERMINAL DEVICE AND PROCESSING PROGRAM UPDATE CONTROL METHOD FOR THE SAME

(75) Inventor: Hirokazu Takahashi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 195 days.

(21) Appl. No.: 12/666,518

(22) PCT Filed: Jun. 27, 2008

(86) PCT No.: PCT/JP2008/061713
§ 371 (c)(1),
(2), (4) Date: May 25, 2010

(87) PCT Pub. No.: WO2009/001920
PCT Pub. Date: Dec. 31, 2008

(65) Prior Publication Data
US 2010/0255883 A1    Oct. 7, 2010

(30) Foreign Application Priority Data

Jun. 27, 2007 (JP) ................................ P2007-169815

(51) Int. Cl.
*H04B 17/00* (2006.01)
*H04M 1/725* (2006.01)
*G06F 9/445* (2006.01)

(52) U.S. Cl.
CPC ............. *G06F 8/65* (2013.01); *H04M 1/72525* (2013.01)
USPC ........ 455/566; 455/405; 455/407; 455/414.1; 455/418

(58) Field of Classification Search
CPC .................................................. H04B 17/0067
USPC ....................... 455/566, 405, 407, 414.1, 418
See application file for complete search history.

(56) References Cited

U.S. PATENT DOCUMENTS 7,487,316 B1 * 2/2009 Hall et al. ...................... 711/168
7,594,063 B1 * 9/2009 Estakhri et al. ............... 711/103
8,315,004 B2 * 11/2012 Hirano et al. ................... 360/69

(Continued)

FOREIGN PATENT DOCUMENTS

JP    11-102343    4/1999
JP    2002-215375   8/2002

(Continued)

OTHER PUBLICATIONS

International Search Report for PCT/JP2008/061713, mailed on Jul. 22, 2008, 1 page.

(Continued)

*Primary Examiner* — Wen Huang
(74) *Attorney, Agent, or Firm* — Duane Morris LLP (57) ABSTRACT

A mobile terminal device includes: a display section that displays information; a storage section that stores processing programs for internal processings; a communication section; and a control section that updates any of the processing programs by acquiring an update program concerning the processing program in the communication section, wherein the storage section stores a plurality of update screens, and the control section displays one of the update screens on the display section and switches the display on the display section to another update screen each time writing on a predetermined number of blocks of the storage section occurs or any processing of reading from, writing on, and erasing from the storage section occurs when updating the program.

9 Claims, 5 Drawing Sheets

(56) References Cited

U.S. PATENT DOCUMENTS

| | | | | |
|---|---|---|---|---|
| 2001/0055017 A1* | 12/2001 | Ording | | 345/440 |
| 2003/0134625 A1* | 7/2003 | Choi | | 455/418 |
| 2004/0143698 A1* | 7/2004 | Jacobs | | 711/103 |
| 2005/0066139 A1* | 3/2005 | Inoue et al. | | 711/163 |
| 2007/0061545 A1* | 3/2007 | Kuhne | | 711/202 |
| 2007/0268874 A1* | 11/2007 | Vare et al. | | 455/351 |
| 2009/0088145 A1* | 4/2009 | Inohiza | | 455/419 |

FOREIGN PATENT DOCUMENTS

| | | |
|---|---|---|
| JP | 2004-126830 | 4/2004 |
| JP | 2004-134948 | 4/2004 |
| JP | 2005-018418 | 1/2005 |

OTHER PUBLICATIONS

International Preliminary Report on Patentability for PCT/JP2008/061713, issued Jan. 5, 2010, 9 pages.

Yamada, DB Magazine (2003) 13(9):116-124.
JP 2007-169815 JP Office Action dated Sep. 20, 2012.

* cited by examiner

MOBILE TERMINAL DEVICE AND PROCESSING PROGRAM UPDATE CONTROL METHOD FOR THE SAME

CROSS-REFERENCE TO RELATED APPLICATIONS

This is a U.S. National Phase Application of International Application No. PCT/JP2008/061713 filed Jun. 27, 2008, which claims priority to Japanese Patent Application No. 2007-169815 filed Jun. 27, 2007, the disclosures of which are incorporated herein by reference in their entirety.

TECHNICAL FIELD

The present invention relates to a mobile terminal device which performs program update by wireless communications, and a processing program update control method for the same.

BACKGROUND ART

As a result of improvements in multi-functionality of mobile phones, software for the same has grown increasingly complicated and highly sophisticated. As software becomes complicated, the possibility of occurrence of failures (bugs) increases. In order to solve such failures, users must bring their mobile phones to shops or service offices to overwrite correction programs by connecting the mobile phones to an exclusive plug (terminal device), and this is very troublesome.

On the other hand, recently, a method for updating software by acquiring correction programs and additional programs by downloading these from exclusive servers by accessing the exclusive servers via a communication network has been increasingly generalized (For example, refer to Patent Literature 1).

Patent Literature 1: JP-A-2004-134948

DISCLOSURE OF THE INVENTION

Problems that the Invention is to Solve

However, according to the method for updating software by the above described downloading, the update status must be notified to the user in some cases.

That is, in the above method, downloading and update processing are internal processings, and are not exposed to the sight of the user. Therefore, for the user, no display indication is provided and determination as to whether the processing is progressing normally is impossible, and moreover, these may be misunderstood as a failure.

Further, in the method described above, even when it is displayed that the update processing is being performed, if no change appears on the display, the user does not know at all whether the processing is progressing normally. Therefore, there is a possibility that the user feels anxious about this and forcibly ends the update processing, and as a result, the software is partially broken.

Not only in software update processing, when the display is changed, generally, by use of a timer, a simple animation is displayed by switching the display to another display upon each elapse of a predetermined time.

However, in order to minimize the time during which an unstable state of software update continues, it is desired to use most of the processing capacity of the CPU for update processing. Particularly, in the case of a large-sized software update, it is preferable that a timer is not used. That is, if the resources of the CPU are also used for timer control, the update time becomes longer, so that it is preferable that a timer is not used during software update.

The present invention was made for solving the problem described above, and an object thereof is to provide a mobile terminal device which can properly notify a software update status to a user without extending the time required for software update as much as possible and the processing program update control method.

Means for Solving the Problems

In order to solve the problem described above, according to a first aspect of the present invention, there is provided: a display section that displays information; a storage section which includes a storage region divided so as to include a plurality of blocks, and which stores a processing program for internal processings; a communication section that is connectable to a public communication network; and a control section that updates the processing program by acquiring an update program concerning the processing program in the communication section, wherein the storage section stores a plurality of update screens for indicating that the processing program is being updated, and wherein the control section displays at least one of the plurality of update screens on the display section and switches a display on the display section to another update screen each time writing on a predetermined number of blocks of the storage section occurs when updating the processing program.

Further, according to a second aspect of the present invention, there is provided: a display section that displays information; a storage section that stores a processing program for internal processings; a communication section that is connectable to a public communication network; and a control section that updates the processing program by acquiring an update program concerning the processing program in the communication section, wherein the storage section stores a plurality of update screens which indicate that the processing program is being updated, and wherein the control section displays at least one of the plurality of update screens on the display section, monitors readout processing from the storage section, writing processing on the storage section, and erasing processing for erasing a portion where necessary in the storage section, and switches a display on the display section to another update screen according to changes in processing content when updating the processing program.

Further, according to the present invention, it is preferable that the control section counts each time of occurrence of any of the readout processing, the writing processing, and the erasing processing when updating the processing program, and switches the update screen being displayed on the display section to another update screen when a total of the counts reaches a predetermined number.

Further, according to the present invention, it is preferable that the control section counts a value which differs by processing type.

Further, according to the present invention, it is preferable that a count value of the writing processing is larger than a count value of the readout processing.

Further, according to the present invention, it is preferable that a count value of the erasing processing is larger than a count value of the readout processing.

According to the present invention, it is preferable that the storage section includes a non-volatile first storage device and a volatile second storage device, and the control section counts each time of occurrence of any of the readout processing from, the writing processing on, and the erasing processing from the first storage device after the update program is stored in the second storage device.

Further, according to a third aspect of the present invention, there is provided: a display section that displays information, a storage section that stores a processing program for internal processings, and a communication section that is connectable to a public communication network, comprising the steps of: acquiring an update program concerning the processing program in the communication section; updating the processing program according to the acquired update program; displaying at least one of a plurality of update screens stored in advance in the storage section on the display section when updating the processing program, where the plurality of update screens indicating that the processing program is being updated are stored in the storage section; and switching the displayed update screen on the display section to another update screen according to changes in processing content of readout processing from the storage section, writing processing on the storage section, and erasing processing of a portion where necessary in the storage section.

Advantage of the Invention

The present invention can provide a mobile terminal device which can properly notify a user of a software update status while avoiding extension of the time to be taken for software update as much as possible, and a processing program update control method for the same.

DESCRIPTION OF REFERENCE NUMERALS

10: mobile phone, 11: communication section, 12: control section, 13: storage section, 14: voice processing section, 15: display section, 16: operation section, 120: program update control section, 121: update program acquisition section, 123: casing open/close detection section, 124: screen display control section, 131: first storage device, 132: second storage device.

BEST MODE FOR CARRYING OUT THE INVENTION

Figure 1:
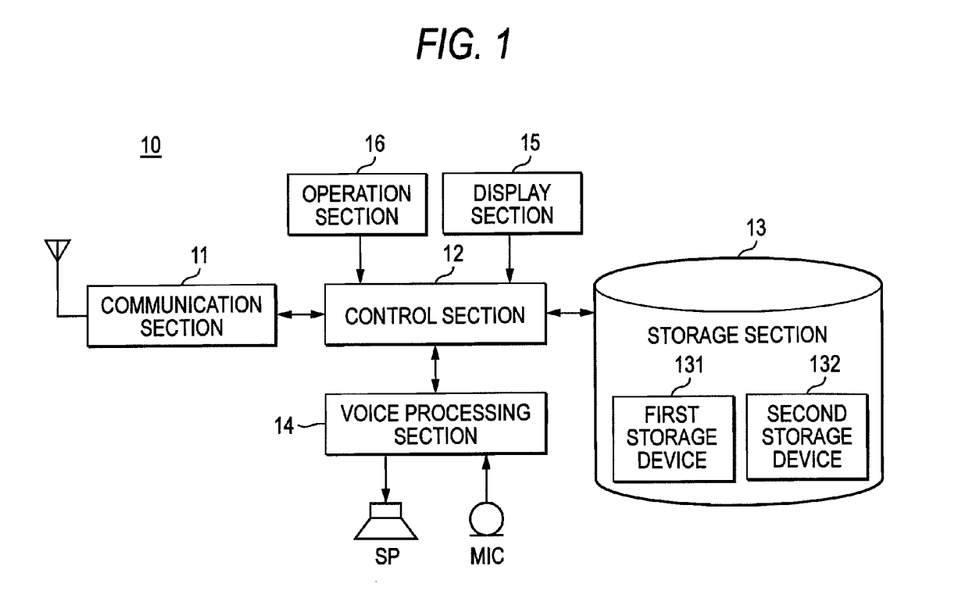
FIG. 1 A block diagram showing an internal configuration of a mobile terminal device of an embodiment of the present invention.

FIG. 1 is a block diagram showing an internal configuration of a mobile terminal device of an embodiment of the present invention. Here, a mobile phone is shown by way of example as a mobile terminal device.

The mobile phone 10 as a mobile terminal device includes, as shown in FIG. 1, a communication section 11, a control section 12, a storage section 13, a voice processing section 14, a display section 15, and an operation section 16.

By using a channel assigned by any of the base stations not shown, the communication section 11 transmits and receives radio signals to and from the base station via a public communication network to communicate with other communication devices and servers. Here, the communication section 11 acquires an update program concerning any of the processing programs.

The control section 12 includes a CPU. The control section 12 performs program update control for controlling the storage section 13 so as to overwrite (processing including writing, readout, and erasing described later) an update program acquired via the communication section 11 over a corresponding processing program.

A plurality of processing programs for internal processings are stored in the storage section 13. The storage section 13 includes a non-volatile first storage device 131 (a non-volatile semiconductor memory, a hard disk device, an optical disk device, etc.), and a random-accessible second storage device 132 (for example, a volatile SRAM or DRAM), etc. Here, description is given on the assumption that the first storage device 131 is a non-volatile semiconductor storage device, and an NAND type flash memory on which data is written in units of blocks is used.

The voice processing section 14 processes voice signals output from a speaker (SP) and voice signals input in a microphone (MIC, referred to as mike hereinafter).

That is, the voice processing section 14 amplifies voices input from the mike and applies analog/digital conversion thereto, and further applies signal processing such as encoding, etc., to convert the voices into digital voice data, and outputs the digital voice data to the control section 12.

Further, the voice processing section 14 converts the voice data supplied from the control section 12 into analog voice signals by applying signal processings such as decoding, digital/analog conversion, and amplification, and outputs the signals to the speaker.

The display section 15 is configured by using a display device such as a liquid crystal display panel or an organic EL (Electro-Luminescence) panel, and displays information corresponding to video signals supplied from the control section 12.

The display section 15 displays various information and images such as a telephone number of a destination when making a call by a mobile phone, a telephone number of a call source when receiving a call, content of incoming mail and outgoing mail, dates, times, a battery remaining amount, information as to blocking calls, and a standby screen.

Here, as an example of the display section 15, an organic EL is used.

The organic EL is composed of organic light-emitting diodes (OLED), and has advantages such as high illuminance, thin configurability, a wide viewing angle and low power consumption, however, due to the device's characteristics, the organic EL is very weak in continuous use. Specifically, in the organic EL, display pixels themselves emit light with colors, so that the illuminance deteriorates in each pixel according to the use time. Therefore, the organic EL also has a disadvantage in that, when only a specific portion of the organic EL is left continuously displaying, the illuminance of only pixels in use lowers, and when the pixels and adjacent pixels which have not deteriorated are made to display the same color, a phenomenon (burn-in) in which the tone of the color becomes different between these pixels occurs.

The operation section 16 includes keys to which various functions are assigned, such as a power supply key, a talk key, numeric keys, character keys, direction keys, a determination key, and a call key, and when these keys are operated by a user, the operation part generates signals corresponding to the operation content, and inputs these as user's commands into the control section 12.

Also, a server (not shown) is connected via a public communication network, and processing programs described later are stored.

Figure 2:
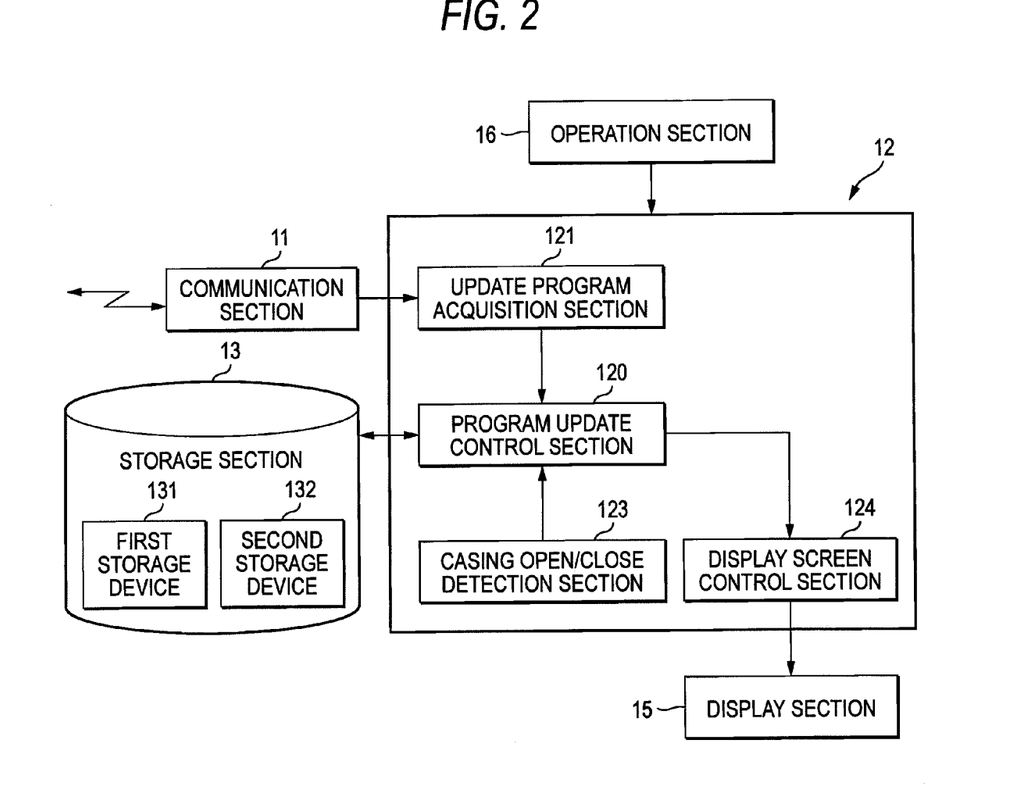
FIG. 2 A block diagram showing a functionally developed internal configuration of a control section shown in FIG. 1.

As an internal configuration functionally developed and shown in FIG. 2, the control section 12 includes a program update control section 120, an update program acquisition section 121, a casing open/close detection section 123, and a screen display control section 124.

The update program acquisition section 121 acquires a processing program for updating acquired by downloading through communications with the server via the communication section 11 and supplies the processing program to the program update control section 120. To the program update control section 120, a signal showing an open/close state of the casing detected by the casing open/close detection section 123 is also supplied.

The program update control section 120 performs program update control for controlling the storage section 13 so as to write an update program acquired by the update program acquisition section 121 over a processing program corresponding to the update program.

Also, when the program update control is performed, the program update control section 120 displays an update screen displaying a progress status of program update on the display section 15 by controlling the screen display control section 124, and controls the display section 15 so as to make switching between display and nondisplay of the update screen, each time writing on a predetermined number of blocks of the storage section 13 in which a flash memory is installed occurs.

Also, the program update control section 120 changes the update screen to be displayed on the display section 15 by controlling the screen display control section 124. The change timing is when the open/close state of the casing changes during nondisplay, when writing on, reading from, and erasing from the first storage device 131 and the second storage device 132 occur, and when the blocks being written on are changed. Details will be described later.

Hereinafter, software update processing will be described.

When it is detected that the user performs an operation for requesting software update by operating the operation section 16 or the communication section 11 receives a request for software forcible update from a public communication network, the control section 12 connects the communication section 11 to a predetermined server (not shown). Incidentally, without limiting to the communication section 11, an interface, which is not shown, may receive the command signal of forcible update by using infrared communication, near field communication, or a communication cable, etc.

Next, the control section 12 (update program acquisition section 121) performs authentication with a server by using a code for identifying a telephone number and terminal of the mobile phone 10, and when the authentication is successfully performed, the control section confirms a processing program to be updated. That is, the type and the date of update of the processing program to be stored in the first storage device 131 are confirmed by the program update control section 120, and by using the results of this confirmation, it is determined whether any program should be downloaded from the server by the update program acquisition section 121. When there is a processing program which should be updated, the update program acquisition section 121 downloads the processing program via the public communication network by the communication section 11. Incidentally, the processing program is taken out from data received by the communication section 11 by the program update control section 120, and temporarily stored in the second storage device 132.

When downloading of the latest processing program is thus completed, next, the program update control section 120 performs program update control to overwrite the old processing program in the first storage device 131.

First Embodiment

Figure 3:
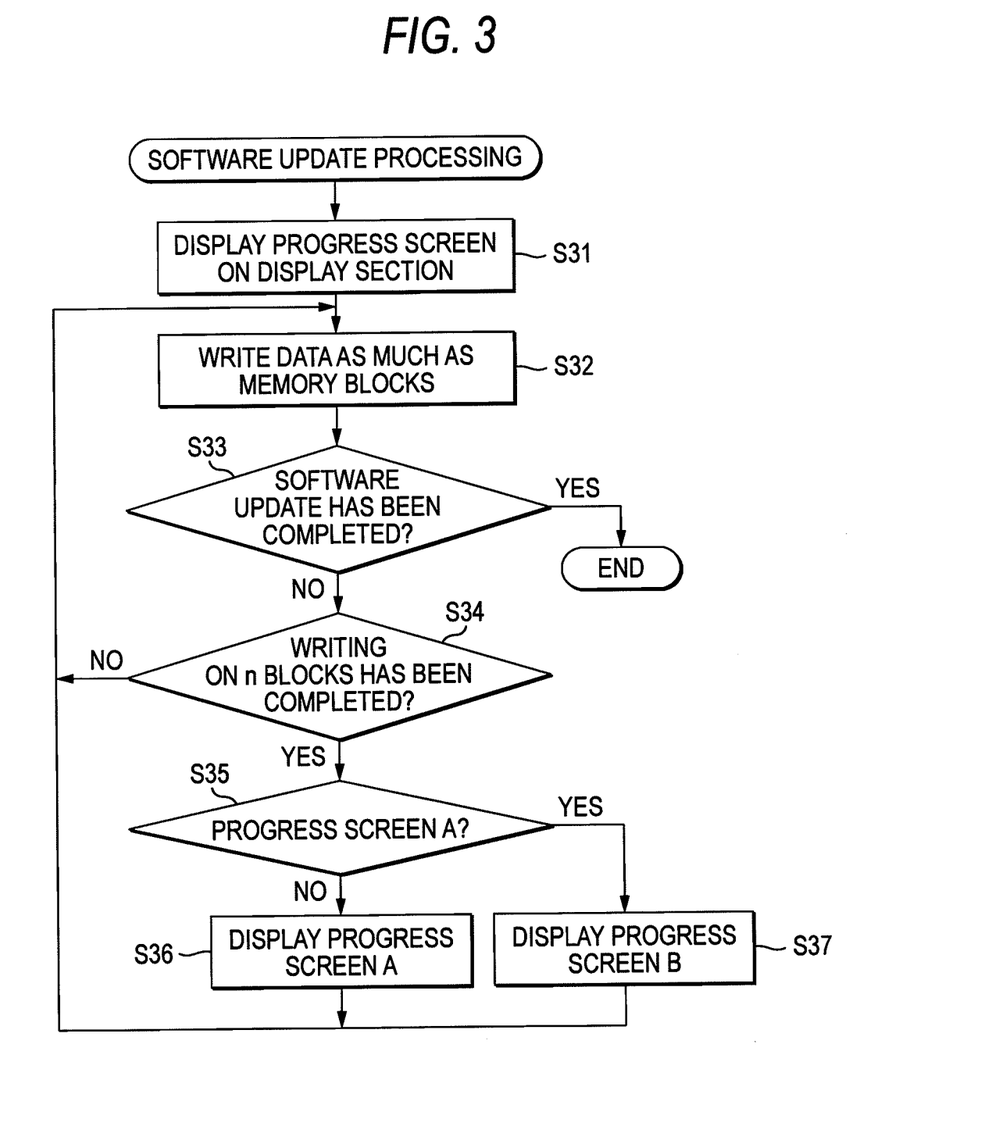
FIG. 3 A flowchart showing operations (software update processing) of a mobile terminal device of a first embodiment of the present invention.

FIG. 3 is a flowchart shown for describing program update control of a mobile terminal device of a first embodiment of the present invention, and here, a flow of software (program) update processing is shown.

Hereinafter, software update operations of the mobile terminal device shown in FIG. 1 and FIG. 2 will be described in detail with reference to the flowchart of FIG. 3.

Figure 5:
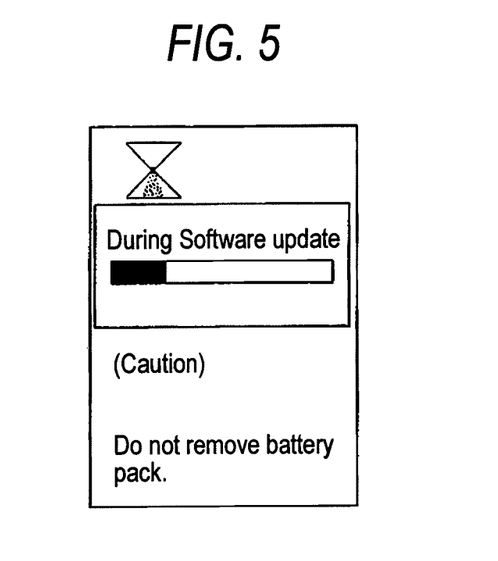
FIG. 5 A view showing an example of a progress screen A to be displayed on the mobile terminal device of the embodiment of the present invention.
Figure 6:
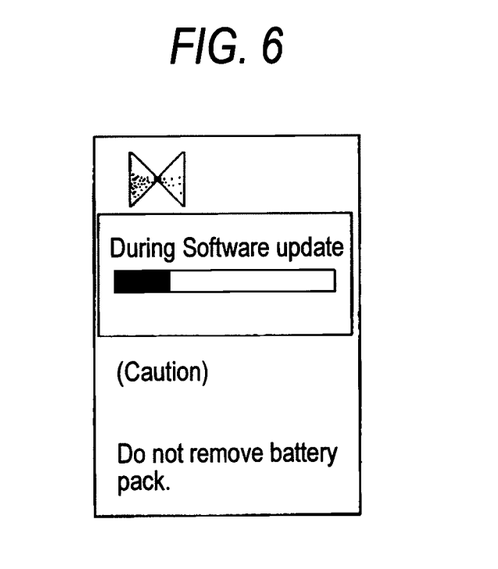
FIG. 6 A view showing an example of a progress screen B to be displayed on the mobile terminal device of the embodiment of the present invention.

During the program update processing, the control section 12 (program update processing section 120) displays a progress screen (update screen) A or B having screen structures examples of which are shown in, for example, FIG. 5 and FIG. 6, on the display section 15 by controlling the screen display control section 124 (S31).

Here, as a progress screen, the degree of progress of the program update processing is indicated by a progress bar (elevator icon). Further, an hourglass mark indicating that the resources of the control section 12 are used for memory access is also displayed on the upper left of the screen. Pluralities of screens shown in FIG. 5 and FIG. 6 are stored in the storage section 13. For each display mode of the progress bar, each the screens include a screen including an hourglass mark oriented vertically as shown in FIG. 5 (progress screen A) and a screen including an hourglass mark oriented horizontally as shown in FIG. 6 (progress screen B). That is, the screens are prepared in such a way that, for a low degree of progress, two types of progress screens A and B with different hourglass marks are provided, for a medium degree of progress, two types of progress screens with different hourglass marks are provided, and for a high degree of progress, two types of progress screens with different hour glass marks are provided. Further, by switching these pluralities of screens including the images with different hourglass marks in order as described later according to the degree of progress by controlling the display screen control section 124, simple animation processing is performed.

When performing the program update control, the program update processing section 120 starts writing of a processing program for update acquired by the update program acquisition section 121 via the communication section 11 on a NAND flash memory, which is installed as the first storage device 131, in units of blocks (S32).

Here, update (overwriting) of the processing program as much as memory blocks corresponding to the capacity, which the acquired processing program has, has not been completed (S33: "NO"), so that the program update processing section 120 further determines whether writing of the processing program corresponding to n (arbitrary) blocks prescribed in advance has been finished (S34).

At Step S33, when it is determined that update of the processing program as much as memory blocks corresponding to the capacity that the acquired processing program has has been finished (S33: "YES"), the software update processing is ended.

At Step S34, when writing on n memory blocks is not finished (S34: "NO"), the program update processing section 120 repeats Step S32 and subsequent steps, and when writing on n memory blocks is finished (S34: "YES"), the type of the progress screen (screen shown in FIG. 5 or FIG. 6, etc.) being displayed on the display section 15 is further confirmed. The progress screen on the display section 15 can be determined by referring to a flag (not shown) assigned to and stored in a predetermined region of the storage section 13 by the display screen control section 124.

Here, by controlling the screen display control section 124, the program update processing section 120 displays the progress screen A with an hourglass mark oriented vertically on the display section 15 (S36) when the B type progress screen with an hourglass mark oriented horizontally is being displayed (S35: "NO"), and displays the progress screen B on the display section 15 (S37) when the progress screen A is being displayed (S35: "YES").

During the program update processing, both hardware and software fully occupy the resources of the control section 12, so that even use of a timer in the background is not preferable. Therefore, according to the first embodiment of the present invention described above, instead of use of a timer, the number of times of block writing on the first storage device 131 (flash memory) is counted, and control for switching the update screen display pattern on the display section 15 is performed. Accordingly, without using a timer, a progress screen indicating that the program is being updated can be displayed by using animation display without complicated processing. Thus, active images can be displayed without harmful influence on the resources of the control section 12, so that harmful influence such as extension of the update time does not occur, and through the animation display, a user can confirm "smooth progress of the update processing without freeze," and it can be avoided that the user feels anxious needlessly.

In addition, the first embodiment shows an example in which the display is changed according to the number of written blocks, however, it is also allowed that the display is updated each time a predetermined number of read blocks are counted.

Also, the first embodiment is described by using an example in which the screen is switched based on whether writing on the predetermined number of blocks has been completed, however, without limiting to this, for example, it is also allowed that the screen is switched for each of a predetermined number of pages.

Second Embodiment

Figure 4:
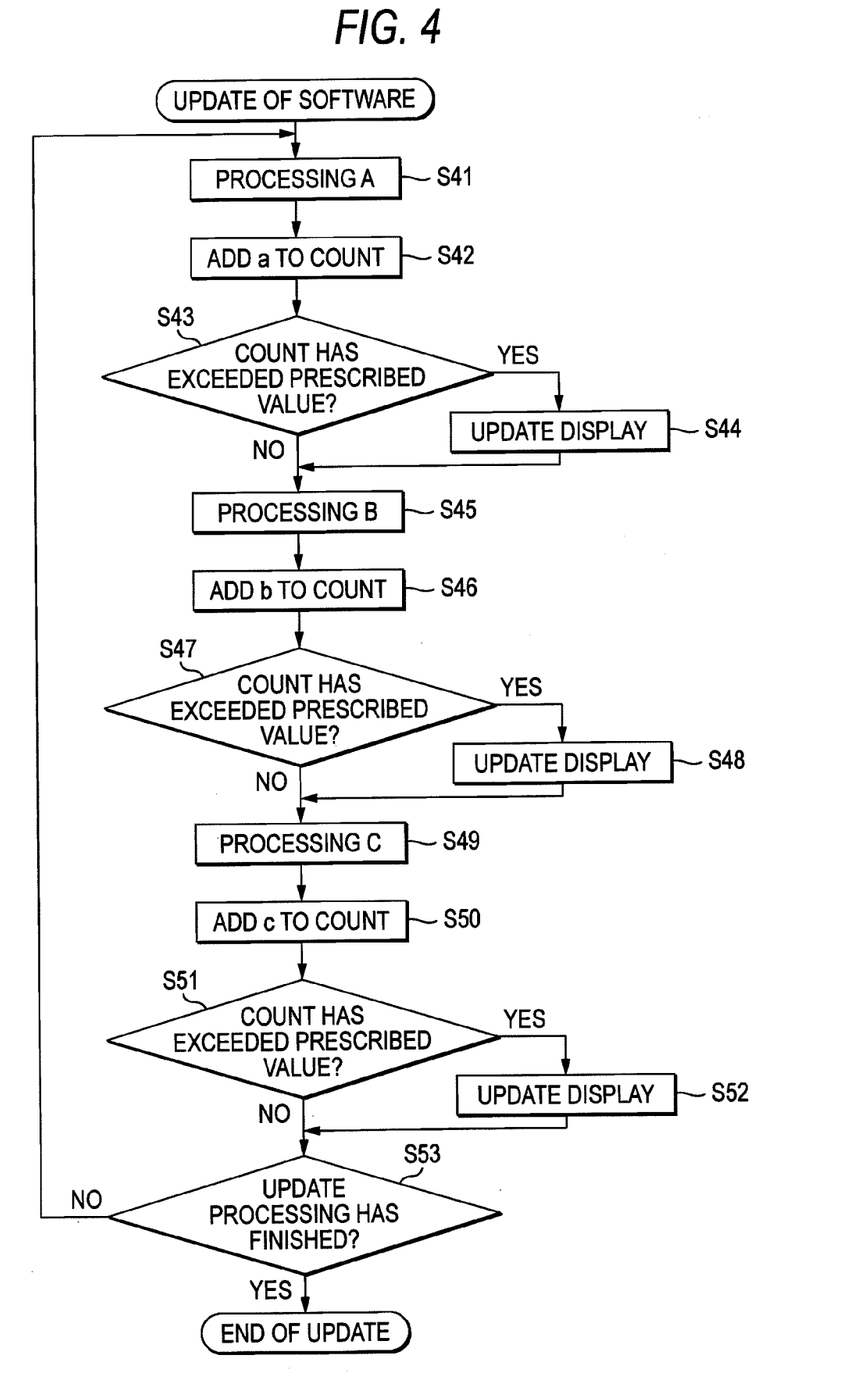
FIG. 4 A flowchart showing operations (software update processing) of a mobile terminal device of a second embodiment of the present invention.

FIG. 4 is a flowchart shown for describing program update control of a mobile terminal device of a second embodiment of the present invention. Here, unlike the first embodiment described concerning writing processing, processings other than writing are also considered.

That is, it has been described with using the terms of update processing and overwriting processing. However, a plurality of processings are included in the update and the overwriting processing.

In detail, when a latest processing program is downloaded and stored in the second storage device 132 and update processing is started, the program update control section 120 reads out a corresponding processing program (old program) from the first storage device 131 to the second storage device 132 in units of blocks or regions smaller than the blocks. Then, by writing a copy of a readout portion of the old program on an unused area of the first storage device, a copy of the old program is created. Next, the program update control section 120 replaces a portion readout to the second storage device 132 of the old program by a corresponding portion of the latest processing program.

Next, the process enters processing for writing a part of the replaced latest program on the first storage device 131. This writing processing includes processing for erasing in advance corresponding regions of the old program (not a copy but the original) in the first storage device 131 in units of regions or blocks on which the latest program should be written, and processing for writing on the erased regions or blocks.

Thus, the update processing includes at least readout, erasing, and writing processings. In detail, other processings are also included. As one of the processings, data of the latest program to be downloaded includes a progress management table, and the program update control section 120 performs program correctness determination as required to confirm that change to the latest processing program is successfully progressing, and performs processing for writing on the progress management table on the first storage device 131. Accordingly, even if the update processing is interrupted due to some trouble, updated portions can be grasped, and update can be restarted. Further, restoration processing for restoring to the state before update by using the copy on the first storage device even when the update fails based on update result determination is also included.

In the second embodiment, the control section 12 monitors occurrence of a plurality of processings described above.

Hereinafter, software update operations based on the second embodiment of the mobile terminal device shown in FIG. 1 and FIG. 2 will be described in detail with reference to the flowchart of FIG. 4.

First, when the program update processing is started, the control section 12 (readout program update processing section 120) displays the progress screen A on the display section 15 by the screen display control section 124 as in the first embodiment.

Next, when processing A (for example, readout processing described above) occurs (S41), the control section 12 writes a count value a weighted according to the processing A on the second storage device 132 (S42).

Here, the control section 12 determines whether a total count value has exceeded a prescribed value due to the addition of the value a (S43), and when the total count value is smaller than the prescribed value (S43: "NO"), the control section 12 further determines whether processing B (for example, erasing processing described above) has occurred, and when the processing B occurs (S45), the control section 12 writes a count value b weighted according to the processing B on the second storage device 132 (S46).

Here, the control section 12 determines again whether the total count value has exceeded the prescribed value due to the addition of the value b (S47). When the total count value is smaller than the prescribed value (S47: "NO"), the control section 12 further determines whether processing C (for example, writing processing described above) has occurred. When the processing C occurs (S49), similarly, the control section 12 writes a count value c weighted according to the processing C on the second storage device 132 (S50), and compares a total count value and the prescribed value (S51). Here, when the total count value is smaller than the prescribed value (S51: "NO"), the control section 12 determines whether all processings concerning the update have been finished (S52). Until the update processing is completed, the control section 12 repeats Steps S41 to S53.

When the total count value exceeds the prescribed value at Steps S43, S47, and S51, processing for changing the progress screen being displayed on the display section 15 is performed (S44, S48, S52). That is, as a result of confirmation of the type (of the screen shown in FIG. 5 or 6, etc.) by the display screen control section 124, if it is confirmed that the progress screen A (FIG. 5) described above is being displayed, the program update control section 120 updates the display to the progress screen B (FIG. 6), and if it is confirmed that the progress screen B is being displayed, the program update control section updates the display to the progress screen A. In addition, the progress screen being displayed on the display section 15 can be determined by referring to a flag (not shown) assigned to and stored in a predetermined region of the second storage device 132 by the display screen control section 124 as in the first embodiment. Then, when the display screen is updated, the total count value is reset. The program update control section 120 also performs control for changing the progress screen to a progress screen including a progress bar showing a higher degree of progress when the number of written blocks exceeds a predetermined amount. Thereafter, processing is switched to processing for updating to a progress screen with a different hourglass indication within the range corresponding to the changed progress bar.

Thus, in the second embodiment, each time any of the processings occur, a value weighted according to the type of the processing is added, and each time the count value exceeds the prescribed value, the progress screen is changed. Accordingly, the control section 12 can display simple animation on the display section 15 without using a timer, and without harmful influence of update processing time extension, it can be shown for the user that the update is progressing without problems (without freeze).

In the case of the first embodiment, the number of written blocks is counted, however, according to the second embodiment, the count value is increased in smaller units, so that animation can be more smoothly displayed.

Further, for writing, readout, and erasing processings, different values such as a, b, and c are provided as count values, respectively. These values preferably correspond to the times to be taken for the processings. That is, writing takes a longer time than readout. Here, by setting a count value of writing to be much larger than a count value of readout processing, a total count value increases with progress closer to actual elapse times of the processings. That is, in comparison with the case where count values equal among the processings are provided, the display update looks as if it corresponds to the actual elapse time, so that natural animation can be realized even without using a timer. Similarly, when the storage device takes a longer time for erasing than for writing, by setting a count value b concerning erasing processing to be larger than a count value a for writing processing, a screen update period closer to the actual elapse time can be obtained, and the animation becomes natural. In general, writing and erasing processings take a longer time than the time for readout, so that a count value is set to be larger than the count value of readout, and the relationship between count values for writing and erasing is properly set according to whether writing or reading the characteristics of the first storage device take a longer time. In other words, preferably, the length of the required time is in proportion to the count value.

In addition, the first embodiment and the second embodiment are described individually for ease of description, however, they may be realized simultaneously. In this case, preferably, their display periods have a correlation with each other.

In addition, concerning downloading of a latest processing program, an example in which the entire processing program is downloaded is shown in the first and second embodiments, however, downloading is not limited to this. When the size of the processing program is large, at the time of access to a server, a difference between the processing program inside the first storage device and the latest program is identified, and only a portion including the difference may be downloaded, and in an extreme instance, only the difference data is downloaded. These cases are realized when only a necessary portion is readout from the first storage device to the second storage device and the difference data is written over the portion, and thereafter, the overwritten portion is written on the first storage device again. When writing on the first storage device, old data is erased first and then writing is performed as described above.

In addition, the first and second embodiments are described by using an example in which only one progress screen A is displayed as a screen indicating that the process is under update, and even when many progress screens are installed and the progress indication is performed by using a combination of the plurality of progress screens, the present invention is also applicable.

According to the embodiments of the present invention described above, only a mobile phone is shown by way of example as a mobile terminal device, and without limiting to a mobile terminal device, the present invention is also applicable to PDAs (Personal Digital Assistants) and game machines, etc.

Also, the functions of the respective constituent blocks which the mobile terminal device of the embodiment of the present invention shown in FIG. 2 has may be all realized by software or a part of the functions may be realized by hardware. For example, data processings in the program update control section 120, the update program acquisition section 121, and the screen display control section 124 may be realized on a computer by one or a plurality of programs, or a part of the data processings may be realized by hardware.

The invention claimed is:
1. A mobile terminal device comprising:
a display section that displays information;
a storage section, which includes a storage region divided so as to include a plurality of blocks, and which stores a processing program for internal processes;
a communication section that is connectable to a public communication network; and
a control section that updates the processing program by acquiring an update program concerning the processing program in the communication section,
wherein the storage section stores a plurality of update screens for indicating that the processing program is being updated,
wherein the control section displays at least one of the plurality of update screens on the display section and determines whether a predetermined number of blocks of the storage section is changed when updating the processing program, the predetermined number of blocks being greater than one,
wherein, when the control section determines that the predetermined number of blocks of the storage section is changed, the control section switches the update screen being displayed on the display section to another update screen, and
wherein, when the control sections determines that the predetermined number of blocks of the storage section is not changed, the control section does not switch the update screen being displayed on the display section to another update screen.

2. A mobile terminal device comprising:

a display section that displays information;

a storage section that stores a processing program for internal processes;

a communication section that is connectable to a public communication network; and a control section that updates the processing program by acquiring an update program concerning the processing program in the communication section, wherein the storage section stores a plurality of update screens including a first update screen and a second update screen, wherein the first update screen and the second update screen each indicate that the processing program is being updated, and wherein, when updating the processing program, the control section displays the first update screen on the display section, monitors readout processing from the storage section, writing processing on the storage section, and erasing processing for erasing a portion where necessary in the storage section, and switches the first update screen being displayed on the display section to the second update screen according to changes in processing content when updating the processing program and before updating the processing program is completed.

3. The mobile terminal device according to claim 2, wherein the control section counts each time of occurrence of any of the readout processing, the writing processing, and the erasing processing when updating the processing program, and switches the first update screen being displayed on the display section to the second update screen when a total of the counts reaches a predetermined number before updating the processing program is completed.

4. The mobile terminal device according to claim 3, wherein the control section counts a value which differs by processing type when counting.

5. The mobile terminal device according to claim 4, wherein a count value of the writing processing is larger than a count value of the readout processing.

6. The mobile terminal device according to claim 5, wherein a count value of the erasing processing is larger than a count value of the readout processing.

7. The mobile terminal device according to claim 4, wherein a count value of the erasing processing is larger than a count value of the readout processing.

8. The mobile terminal device according to claim 3, wherein the storage section includes a non-volatile first storage device and a volatile second storage device, and wherein the control section counts each time of occurrence of the readout processing from, the writing processing on, and the erasing processing from the first storage device after the update program is stored in the second storage device.

9. A processing program update control method in a mobile terminal device including a display section that displays information, a storage section that stores a processing program for internal processes, and a communication section that is connectable to a public communication network, the processing program update control method comprising the steps of:

acquiring an update program concerning the processing program in the communication section;

updating the processing program according to the acquired update program;

displaying a first update screen, indicating that the processing program is being updated, stored in advance in the storage section on the display section when updating the processing program; and switching the first update screen being displayed on the display section to a second update screen, indicating that the processing program is being updated, stored in advance in the storage section, according to changes in processing content of readout processing from the storage section, writing processing on the storage section, and erasing processing of a portion where necessary in the storage section before the updating the processing program is completed.

* * * * *